(12) United States Patent  
Culp et al.

(10) Patent No.: US 7,457,403 B2
(45) Date of Patent: Nov. 25, 2008

(54) METHOD AND APPARATUS FOR DETERMINING A REAL TIME AVERAGE SPEED OF ANSWER IN AN AUTOMATIC CALL DISTRIBUTION SYSTEM

(75) Inventors: Christopher G. Culp, Wheaton, IL (US); James E. Anderson, Glen Ellyn, IL (US)

(73) Assignee: Rockwell Electronic Commerce Technologies, LLC, Wooddale, IL (US)

( * ) Notice: Subject to any disclaimer, the term of this patent is extended or adjusted under 35 U.S.C. 154(b) by 1144 days.

(21) Appl. No.: 10/214,674

(22) Filed: Aug. 8, 2002

(65) Prior Publication Data

US 2004/0028211 A1  Feb. 12, 2004

(51) Int. Cl.
*H04M 3/00* (2006.01)
*H04M 5/00* (2006.01)

(52) U.S. Cl. .................. 379/265.01; 379/265.05; 379/265.14; 379/266.06; 379/266.08

(58) Field of Classification Search ............ 379/265.01, 379/266.03, 265.02, 266.08, 265.03, 309, 379/265.12, 266.06, 265.05, 265.08, 265.11, 379/265.14

See application file for complete search history.

(56) References Cited

U.S. PATENT DOCUMENTS

| | | | |
|---|---|---|---|
| 4,510,351 A * | 4/1985 | Costello et al. | 379/265.01 |
| 4,829,563 A * | 5/1989 | Crockett et al. | 379/309 |
| 5,214,688 A * | 5/1993 | Szlam et al. | 379/266.08 |
| 5,390,243 A | 2/1995 | Casselman | |
| 5,555,179 A | 9/1996 | Koyama et al. | |
| 5,765,033 A | 6/1998 | Miloslavsky | |
| 5,787,163 A * | 7/1998 | Taylor et al. | 379/266.08 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,355 A | 3/2000 | Crockett | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,263,065 B1 * | 7/2001 | Durinovic-Johri et al. | 379/266.03 |

(Continued)

*Primary Examiner*—Thjuan K Addy
(74) *Attorney, Agent, or Firm*—Husch Blackwell Sanders, LLP (57) ABSTRACT

A method is provided for automatically updating a "Real Time" Average Speed of Answer, RASA, for a number of calls received by an automatic call distributor, ACD, during a set interval. This "real time" average speed of answer may be determined across a sliding time window via moving averages and exponential smoothing. The method includes the steps of computing a current average Speed of Answer, SA, for the number of calls received by the ACD during the set time interval, by dividing total waiting time to answer for these calls by the number of calls and scaling the current SA by a weight factor W. The real time average speed of answer, RASA, is updated by scaling a previous RASA by the unity complement of W, i.e. (1−W), and augmenting it by the scaled current SA.

36 Claims, 4 Drawing Sheets

U.S. PATENT DOCUMENTS

| | | | | |
|---|---|---|---|---|
| 6,282,282 | B1 * | 8/2001 | Wineberg et al. | 379/265.02 |
| 6,295,354 | B1 | 9/2001 | Dezonno | |
| 6,345,305 | B1 | 2/2002 | Beck et al. | |
| 6,373,836 | B1 | 4/2002 | Deryugin et al. | |
| 6,389,007 | B1 | 5/2002 | Shenkman et al. | |
| 6,393,015 | B1 | 5/2002 | Shtivelman | |
| 6,614,903 | B1 * | 9/2003 | Flockhart et al. | 379/265.12 |
| 6,633,640 | B1 * | 10/2003 | Cohen et al. | 379/265.03 |
| 6,732,156 | B2 | 5/2004 | Miloslavsky | |
| 6,744,877 | B1 * | 6/2004 | Edwards | 379/265.02 |
| 6,744,878 | B1 * | 6/2004 | Komissarchik et al. | 379/265.03 |
| 6,823,062 | B2 * | 11/2004 | Kepley | 379/266.06 |
| 6,850,613 | B2 * | 2/2005 | McPartlan et al. | 379/265.02 |
| 7,043,007 | B2 * | 5/2006 | McPartlan et al. | 379/265.02 |

* cited by examiner

METHOD AND APPARATUS FOR DETERMINING A REAL TIME AVERAGE SPEED OF ANSWER IN AN AUTOMATIC CALL DISTRIBUTION SYSTEM

BACKGROUND

The field of the invention relates, in general, to automatic call distribution (ACD) systems, and in particular to an improved real time status updating of incoming customer contacts (calls) to an ACD.

ACD systems typically route incoming customer contacts such as telephone calls to available servicing agents. In many existing systems, the distribution process utilized by such ACD systems concentrates on making agents available to handle customer contacts in a standard first-in first-out scheme. In modern ACD's, the "calls" may be any appropriate type of customer contact including but not limited to conventional telephone calls, emails, facsimiles, VOIP (Voice Over Internet Protocol), other internet or web contacts, etc...

Another important characteristic of some ACD systems is to keep track of information concerning each incoming call, such as the corresponding call-answer waiting time. Such status information must be made available to the ACD system controller for all incoming calls on a continuing basis.

An ACD may be integrated or distributed including a single controller/switch, separate controller (e.g. a PC) running software to control a switch or any other combination hardware and/or software which provides the functionality of an Automatic Call Distribution System. Often, in today's ACD systems, an ACD system controller is made aware of the status of all current calls using a variety of known techniques, for example, via either event-driven updates or periodic updates. Event-driven updates can be very taxing on most systems, as they require excessive processing time during heavy traffic of incoming calls. Periodic updates designed to report on calls answered during a long specific time window are rarely considered timely. The periodic pace at which these updates are sent to the ACD system controller can potentially render them out-of-date, since they are designed to provide status information about calls received during set logging periods.

One major goal of some automatic call distribution systems is to optimize status information of incoming calls to the system controller to potentially maximize the performance of the ACD. One such important status information value has been the speed of answer of all calls queued during a set time period. An average speed of answer developed for real-time display was implemented as an average across a specific logging period. This average speed of answer technique falls within the periodic updating scheme.

It is not uncommon to observe traffic bursts of incoming calls during a certain logging period. Such temporary traffic peaks render the average speed of answer values quite inaccurate and unreliable. Therefore, this average speed of answer value is often not as informative as required for the smooth operation of the ACD system. Improvements to the accuracy of such average speed of answer value permit improved predictions of call volumes as well as call waiting/handling times based on stored system history. These improved predictions can translate into better management of the workforce as the allocation and scheduling of call handlers can be programmed to better meet the needs of the ACD at specific time periods.

One embodiment of an improved method for automatically updating a "Real Time" Average Speed of Answer (RASA) for a number of calls received by an automatic call distributor (ACD) during a set interval provide an average speed of answer determined across a sliding time window using moving averages and exponential smoothing. One embodiment of the method includes the steps of computing a current average speed of answer, SA, for the number of calls received by the ACD during the set time interval, by dividing total waiting time to answer for these calls by the number of calls and scaling the current SA by a weight factor W, and updating the real time average speed of answer, RASA, by scaling a previous RASA by the unity complement to W, i.e. (1−W), and augmenting it by the scaled current SA.

BRIEF DESCRIPTION OF DRAWINGS

The invention, together with the advantages thereof, may be understood by reference to the following description in conjunction with the accompanying figures, which illustrate some embodiments of the invention.

DETAILED DESCRIPTION

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Figure 1:
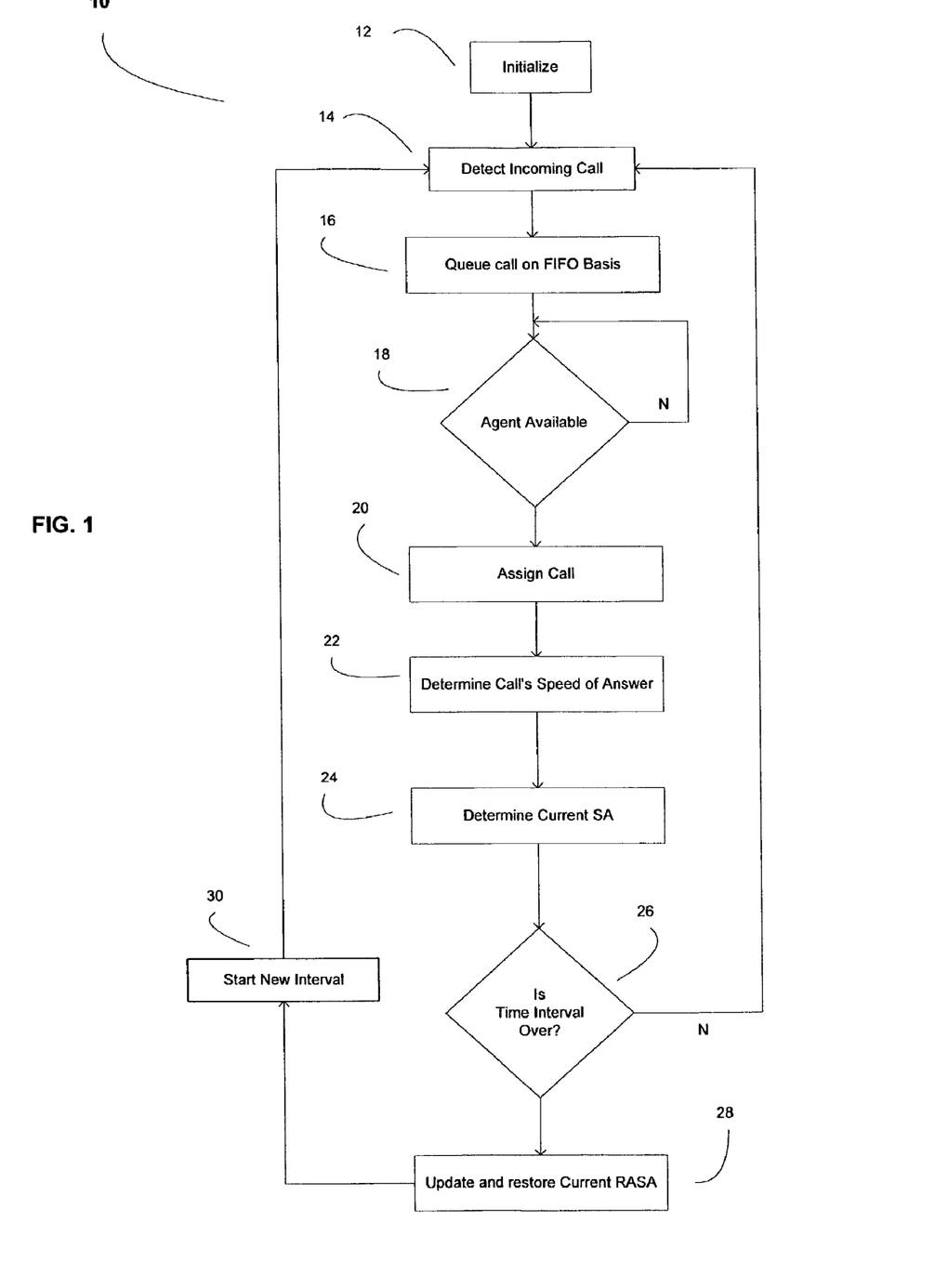
FIG. 1 is a flow chart illustrating a specific embodiment of a method of processing incoming calls to an ACD using moving averages and exponential smoothing.

FIG. 1 is a flow chart 10 depicting a specific embodiment of a method that may be used to provide an understanding of the process of evaluating a real time average speed of answer.

Call centers that deal in calls, as well as service levels, talk times, after-call work times, and call arrival patterns, typically use accurate trackable statistics that represent real-time history of the aforementioned. These call centers are typically equipped with Automatic Call Distribution (ACD) systems. These ACD's distribute the incoming calls based for example upon such factors as the availability, the length of idleness, and the expertise of the agents. These calls to ACD's are automatically queued as they appear on incoming trunks once their number exceeds the number of available agents. The queued calls, if they aren't abandoned or dropped, accumulate their respective call wait times or speed answer times (SA) until the moment they are connected with a phone agent or to an application. Thus, the speed of answer for these calls is directly sensitive to the match of the incoming call load and the number of agents available on the phones.

An average speed of answer (ASA) time was developed in known systems for real-time displays. However this value was implemented as an average across a fixed logging period. This resulted in highly inaccurate values when traffic bursts occur. For example, if a call center had an increase in traffic toward the middle of the fixed logging period, the ASA toward the end of the logging period would have a much lower value than was actually happening. This makes it hard for a call center supervisor or manager to determine the "real time" average speed answer (RASA) for calls queued during traffic spikes.

In the illustrated embodiment of FIG. 1, upon startup, an initialization process 12 is performed and the real time average speed of answer, RASAj, for time interval tj is set at zero, i.e. RASAj=0 for j=0. During any time interval tj, with j being an integer greater or equal to 1, incoming calls are detected at step 14. Each incoming call is automatically placed in a queue at step 16, as discussed above, on a chosen predetermined basis, for example, First In-First Out (FIFO).

As soon as a call is placed in a queue, a speed of answer, SAj, clock may be started. The speed of answer refers to the duration the call resided in the queue before being assigned and connected to an agent or otherwise handled. An agent available search at step 18 is performed and once an agent is available, the call residing at the top of the corresponding queue is assigned to that agent at step 20, and its speed of answer is determined in a process at step 22. As each subsequent call is assigned and connected to an agent, a new speed of answer SAj value is determined at step 24 for the current interval tj. The new speed of answer value SAj may be determined by adding the previous speed of answer values of all previously assigned calls in the current time interval to the call wait time of this subsequent call and dividing it by the total number of calls answered so far in the current interval. So the speed of answer SAj for the current interval tj is then updated as an average call wait time of all assigned calls during the current interval of time tj. The time interval tj may be chosen to equal n seconds, with n being a real number greater than zero.

To remedy the deficiency cited above, a novel sliding window "Real Time" average speed of answer (RASA) may be used. A running speed of answer value, SAj, is computed as introduced above during the total length of time interval tj. The SAj value corresponds to the time to answer for calls answered within the time interval tj, divided by the number of calls answered within the same time interval. So after n seconds are determined to have passed, the newly computed SAj value is then multiplied by a scalar coefficient, W. The coefficient W represents a pre-determined weight factor, e.g. with a value range between zero (0) and one (1), picked to lessen the impact of the new SAj. The previously calculated and stored $RASAj_{-1}$, corresponding to the previous time interval, is also scaled by (1−W), i.e. the unity complement to the aforementioned weight factor W, and added to the new SAj at step 28.

The current (n second) real time average speed of answer, RASAj, would be as follows:

$$RASAj=SAj*W+RASAj_{-1}*(1-W)$$

The new RASAj is, therefore simultaneously, influenced by both the current SAj and the prior $RASAj_{-1}$. The prior $RASAj_{-1}$ includes implicitly, with diminishing impact, all of its own prior $RASAj_{-1}$'s, computed since the initialization. The diminishing impact is due to the fact that the prior $RASAj_{-1}$'s involve increasingly greater multiples of W as they become further removed into the past from the current computation of the RASAj. Since W is chosen to be between 0.0 and 1.0, then $W > W^2 > W^3 >$... Therefore the impact of their corresponding RASAj's diminish exponentially, hence providing exponential smoothing.

The new RASAj is not heavily impacted by a logging period change or by short period changes to information. The combination of the current SAj and the prior $RASAj_{-1}$, both weighted to prevent spikes from having any imposing impact, results in a new value that represents the new-actual RASAj while reducing the impact of logging duration. This new RASAj allows more precise judgments regarding traffic activity within the system that in turn provides supervisors the ability to adjust staff/activity based on data drawn from a wider time window. The RASAj, in combination with work force management would also be of benefit in the routing of calls (application vector).

This novel real time speed of answer can be used to improve call assignment and work force management. For example, when an incoming call is put into a queue, the assignment of the call may be delayed whenever there are an insufficient number of agents available to answer calls on that specific queue. While the limitation of an incoming call to one specific queue has been acceptable in the prior art use, reducing both the wait time of a caller to minimize hang ups and the expense incurred by the ACD for keeping callers on line is beneficial to both parties. For instance, an idle agent in any queue at any time would be properly utilized whenever simultaneously another queue is at or near one of its predetermined wait time thresholds. This reassignment can be done dynamically among all participating queues, i.e. queues with agents that possess overlapping abilities in handling callers coming to a specific trunk or callers with similar characteristics.

This dynamic assignment of agents to callers can also advantageously use the novel real time average speed of answer described herein. A predetermined delay time based on the previous RASA of a certain queue may be automatically adopted to be the maximum allowable time spent by a queued call in a certain queue before the controller attempts to locate an available agent in another queue. The predetermined delay time, which is based on the previous RASA, may be adjusted for the next time interval by the controller to reflect the new RASA value calculated for the current time interval. Therefore, the work force management would benefit from the dynamic assignment of call handling agents between queues during an interval and from the adjustment of the maximum time delay spent in a queue from one time interval to the next.

Figure 2:
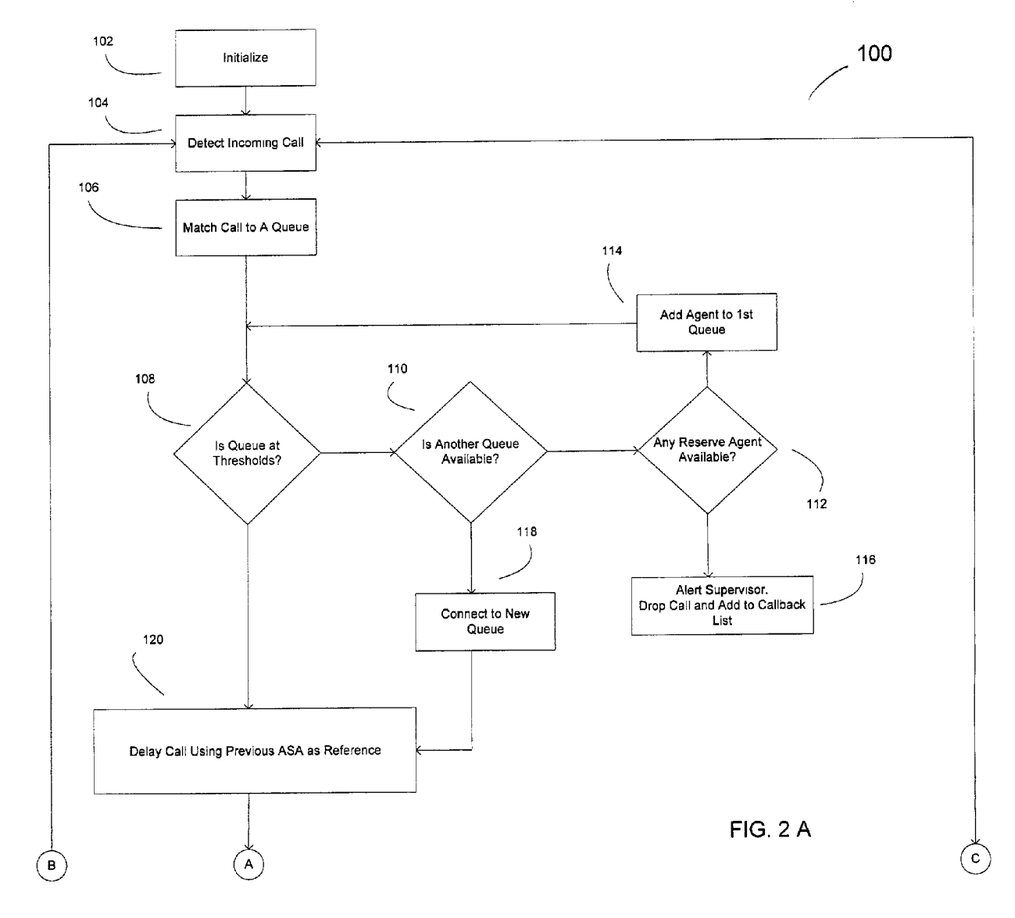
FIGS. 2A and 2B is a flow chart illustrating a specific embodiment of a method of processing incoming calls to an ACD to better utilize the work force.
Figure 3:
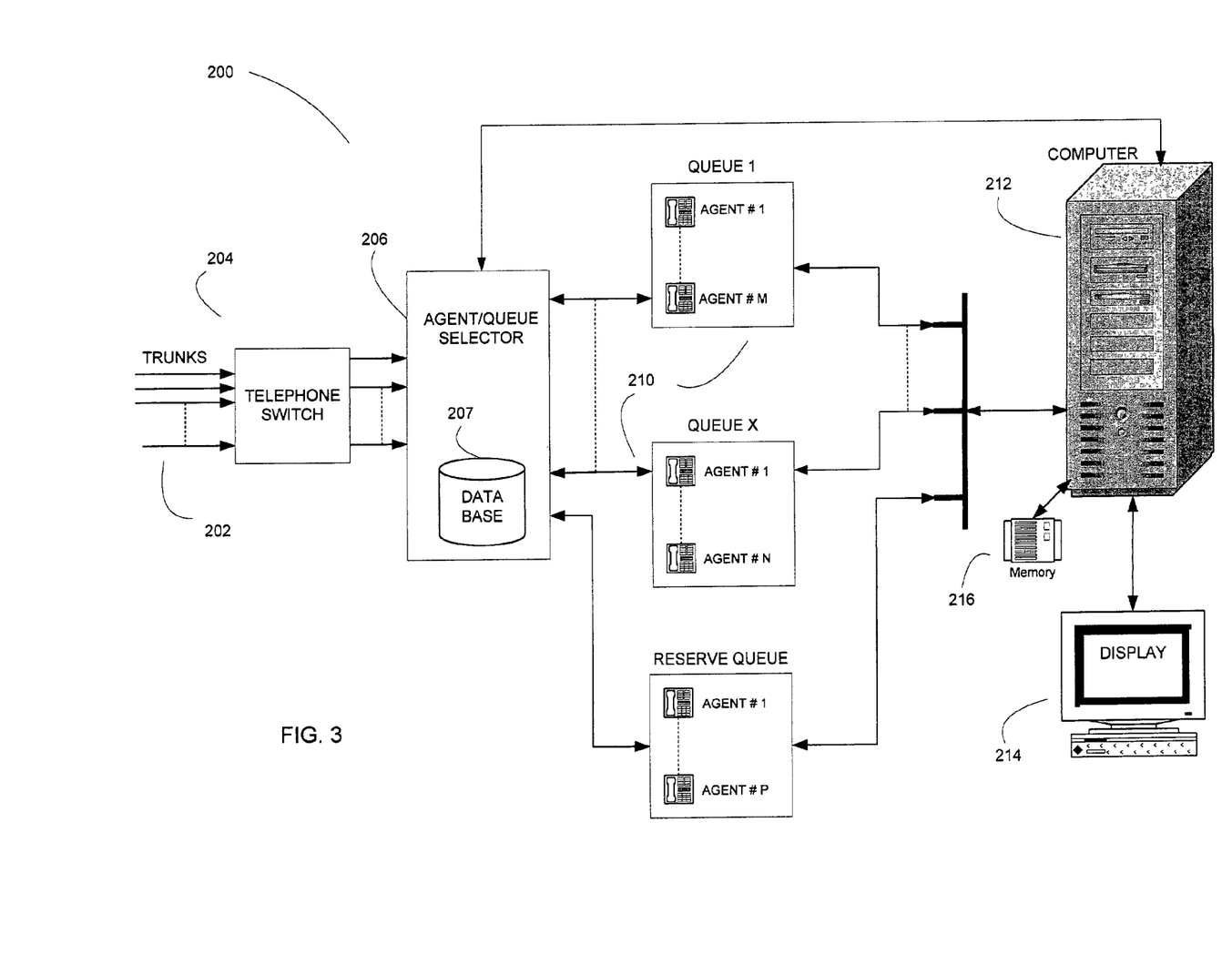
FIG. 3 is a functional block diagram illustrating one embodiment of a call center system.

FIGS. 2A and 2B show a flow chart illustrating another embodiment of a method 100 that may be used to provide a further understanding of the process of utilizing a real time average speed of answer for improved call assignment and work force management. After initialization at step 102, detection of an incoming call is performed as illustrated at step 104. Referring to FIG. 3 there is shown a functional block diagram illustrating an exemplary embodiment of a call center system 200 in which an agent/queue selector 206 coupled to the ACD detects calls and determines (e.g. via the telephone number associated with a particular incoming trunk 202 or a group of incoming trunk lines) the identity of the caller. The embodiment of the call center system 200 of FIG. 3 may also include a set of agent queues 210 associated with at least one computer 212 and a memory 216 as shown. The selector may be connected to a database 207, which may also be accessible by the call handling agents and supervisors, as shown in the embodiment of FIG. 3. The selector 206 may attempt to transfer the caller to a selected queue based, for example, on the characteristics of the trunk and/or the identity of the caller as illustrated at step 106 of FIG. 2A. If the selected queue has exceeded one or more threshold values at step 108, for example, the Maximum Number of Calls allowed in the Queue, MNCQ, or the Maximum Allowable Time in Queue, MATQ, then incoming calls would be considered for routing to another available queue as shown at step 110.

Other queue threshold values may be set to be, for example, the Maximum Number of Calls, MNC allowed to be in progress at any one time during time interval tj. MNC would represent the total number of queued calls added to the total number of working agents. Another queue threshold may consider adding to MNC the total number of agents on reserve.

In one embodiment, if all other queues have also reached their respective thresholds, the controller would consider recruiting an available agent as shown at step 112 from a reserve agent queue. A reserve agent may be assigned to perform other tasks, different from call handling, until the controller and/or a supervisor decides to recruit the reserve agent to handle incoming calls during unexpected heavy calling loads. In the case that no reserve agents are available to handle calls, the on-duty supervisor would be alerted as illustrated at step 116, via a display 214 (see FIG. 3) and the call may be dropped, and may be added to a callback list if warranted based on the caller characteristics and identity.

Once the call is matched to an appropriate queue, the speed of answer until connection to an agent may be measured. Initially, the speed of answer would equal the time the call resides in a particular queue. Further, in an embodiment the speed of answer could automatically have an initial limiting value corresponding to a predetermined fraction of the previous time interval RASAj for this particular queue. The predetermined fraction may be set, for example, to a decimal number between 0.5 and 1.0. Once call is matched to the particular queue, the call may be automatically delayed as illustrated at step 120 by the predetermined fraction of the RASA, for example, as chosen by the supervisor for the particular queue.

If the call is no longer alive, i.e. dropped, before the delay has expired, the following time for dropped calls, HTDC, may be recorded for follow-up porposes, by, for example, adding the caller ID to a callback list.

If an agent becomes available before the time delay has expired as illustrated at step 122, the call may be connected to the agent at step 124. The call's speed of answer is recorded and the time delay for next-in-line calls in the queue is adjusted appropriately to reflect the unexpected early connection of the call.

If the delay has expired at step 122, the call may be designated for immediate assignment to an available agent as illustrated at step 126. If there is no available agent in the current queue, the controller may attempt to find an available agent in other queues at step 130. Again, if no agent is available, then the call is selected for assignment to the very first available agent from any other queue as illustrated at step 132 or to a virtual queue that will acquire priority assignment over the other queues. The call's speed of answer may be tagged to its very first particular queue to which it was initially assigned. Once an agent is available, the call is assigned to the agent as shown at step 136, and a speed of answer is determined for the call at step 138.

As each subsequent call is assigned and connected to an agent, an updated speed of answer SAj value is determined at step 138 for the current interval tj for the particular queue. At the end of interval tj determined at step 140, a new RASAj may be computed at step 142 for the particular queue using the algorithm discussed herein.

The advantage of using an adjustable time delay based on the previous RASAj is that it allows for a responsive and dynamic ACD as the incoming call load is fluctuating. It is understood that in the illustrated embodiment the computed RASAj's are unique to each queue, and therefore RASAj's are impacted by the addition or removal of agents capable of handling calls requiring skills pertinent to a specific queue.

In another embodiment, a predetermined delay may be kept constant during time interval tj in an attempt to maintain a relatively constant queue time based on the previous RASAj value. One purpose for a relatively constant queue time would be to minimize adjustment of any options offered to the caller for either announcements or for caller information during the specific time interval tj.

In another embodiment, the real time average speed of answer algorithm may be applied to evaluate an RASA for a future set time interval using a forward sliding time window of moving averages. One embodiment of the method includes the steps of computing a future real time average speed of answer, $RASA_{j+1}$, for the next set time interval, by scaling the current RASAj by a weight factor W, and augmenting it by a previous $RASA_{j-1}$ scaled by $(1-W)$, as follows:

$$RASA_{j+1} = RASAj * W + RASA_{j-1} * (1-W)$$

The new future RASA is, therefore simultaneously, influenced by both the current and prior RASA's. The new future RASA can be of value in ACD's due to requirements on optimum work force allocation and management. A timely allocation of the ACD's work force may result in significant monetary savings.

In another embodiment, the real time average speed of answer algorithm may be applied to evaluate a real time average speed of dialing when an ACD is involved in setting up outgoing calls and connecting outgoing calls to agents.

In another embodiment, the real time average speed of answer algorithm may be applied to better-forecast future near term RASA trends. A curve matching technique may be utilized for this RASA trend forecasting. Curve matching is an approach used to find the best fit between two curves. By best fit, it is implied that two curves can be aligned together such that a section or sub-curve from one curve is geometrically similar to that of the other curve. Hence, a combination of historical RASA curves from separate but analogous logging periods may be combined together to find a better candidate that matches to the current RASA curve. The resulting RASA curve match may be used by an ACD manager to better predict future near-term RASA's and adjust the corresponding workforce accordingly. This RASA trend forecast may be performed as needed during the corresponding logging period. Accurate near-term RASA forecasts can be of value in ACD's due to requirements on optimum work force allocation and management. The accuracy may result in significant monetary savings.

Specific embodiments of a novel method and apparatus for automatically updating a real time average speed of answer has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, variations, or equivalents that fall within the true spirit and scope of the basic underlying principles disclosed and claimed herein.

The invention claimed is:

1. A method of automatically updating a real time average speed of answer (RASA) for a number of calls received by an Automatic Call Distribution system (ACD) during a set time interval, the method comprising the steps of:

computing a current average speed of answer, SA, for the number of calls received by the ACD during the set time interval, by dividing total waiting time to answer for the calls by the number of calls;

scaling the current SA by a weight factor W; and updating the real time average speed of answer (RASA) by scaling a previous RASA by a weight factor (1−W), and augmenting it by the scaled current SA to provide an updated real-time average speed of answer and applying the updated real-time average speed of answer to control handling of the calls received by the ACD.

2. The method of automatically updating a real time average speed of answer as in claim 1 further comprising measuring a time to answer for each call from a time of detection of the call by the ACD until assignment of the call to a selected agent, and the time to answer is used to compute the SA.

3. A method of automatically updating a real time average speed of answer as in claim 1 comprising further steps of:
   detecting an incoming call to the ACD;
   determining the identity of the incoming call to a telephone trunk line; and
   assigning the incoming call to a selected queue based on characteristics of the telephone trunk line.

4. A method of automatically updating a real time average speed of answer as in claim 1 comprising further the steps of:
   detecting an incoming call to the ACD;
   determining the identity of the incoming call via a dialed telephone number; and
   assigning the incoming call to a selected queue based on characteristics of the dialed telephone number.

5. The method of automatically updating a real time average speed of answer as in claim 3 further comprising assigning the call to a virtual queue with assignment priority over any other queue if the selected queue has reached a maximum time delay.

6. The method of automatically updating a real time average speed of answer as in claim 3 further comprises assigning the call to another queue if the selected queue has reached limiting threshold values rendering it temporarily unable to accept any calls.

7. The method of automatically updating a real time average speed of answer as in claim 6 wherein one of the limiting threshold values is a maximum number of calls allowed in the selected queue, MNCQ.

8. The method of automatically updating a real time average speed of answer as in claim 6 wherein one of the limiting threshold values is a maximum allowable time to reside in the queue, MATQ.

9. The method of automatically updating a real time average speed of answer as in claim 6 further comprises allocating a reserve agent assigned to non-call handling tasks to assign the call to when there is no available agent in any other queues.

10. The method of automatically updating a real time average speed of answer as in claim 6 further comprises determining a maximum time delay in the queue for the call that is a predetermined fraction of a previous time interval RASA or a combination of previous time intervals RASA's for the selected queue.

11. The method of automatically updating a real time average speed of answer as in claim 10 wherein the predetermined fraction is set to a decimal number between 0.5 and 1.0.

12. The method of automatically updating a real time average speed of answer as in claim 10 wherein the maximum time delay in the queue for the call is shortened if an agent is made available before the delay has expired or lengthened if no agent is available after the delay has expired.

13. The method of automatically updating a real time average speed of answer as in claim 12 wherein the maximum time delay in the queue for a subsequent call in the same queue is adjusted to reflect a speed of answer value of a previous assigned call or a combination of speed of answer values of previous assigned calls.

14. A system for automatically updating a real time average speed of answer, RASA, for a number of calls received by an Automatic Call Distribution system, ACD, during a set time interval, the system comprising: means for evaluating a current average speed of answer, SA, for the number of calls received by the ACD during the set time interval, by dividing total waiting time to answer for the calls by the number of calls;
   means for scaling the current SA by a weight factor W; and
   means for determining the real time average speed of answer, RASA, by scaling a previous RASA by a weight factor (I−W), and augmenting it by the scaled current SA to provide an updated RASA and applying the updated RASA to control handling of the calls received by the ACD.

15. The system for automatically updating a real time average speed of answer as in claim 14 wherein a time to answer for each call is measured from a time of detection of the call by the ACD to assignment of the call to a selected agent and the time is used to compute the SA.

16. The system for automatically updating a real time average speed of answer as in claim 14 further comprises means for combining historic RASA curves from separate but analogous logging periods to match a curve of current RASA values to enable prediction of future RASA values.

17. The system for automatically delaying a real time average speed of answer as in claim 14 further comprises:
   means for detecting an incoming call to the ACD;
   means for determining the incoming call via a dialed telephone number; and
   means for assigning the incoming call to a selected queue based on characteristics of the dialed telephone number.

18. The system for automatically delaying a real time average speed of answer as in claim 14 further comprises:
   means for detecting an incoming call to the ACD;
   means for determining the incoming call via a telephone trunk line; and
   means for assigning the incoming call to a selected queue based on characteristics of the telephone trunk line.

19. The system for automatically updating a real time average speed of answer as in claim 18 further comprises means for allocating a reserve agent to assign the call to when there is no available agent in any other queues.

20. The system for automatically updating a real time average speed of answer as in claim 18 further comprising means for determining a maximum time delay in the queue for the call that is a predetermined fraction of a previous time interval RASA or a combination of previous time intervals RASA's for the selected queue.

21. The system for automatically updating a real time speed of answer as in claim 20 further comprising means for setting the predetermined fraction to a decimal number between 0.5 and 1.0.

22. The system for automatically updating a real time average speed of answer as in claim 20 further comprises means for shortening the maximum time delay in the queue for the call if an agent is made available before the delay has expired or for lengthening if no agent is available after the delay has expired.

23. The system for automatically updating a real time average speed of answer as in claim 22 further comprises means for adjusting the maximum time delay in the queue for a subsequent call in the same queue to reflect a speed of answer value of a previous assigned call or a combination of speed of answer values of previous assigned calls.

24. A computer-readable medium having computer executable instructions for performing a method of automatically updating a real time average speed of answer, RASA, for a number of calls received by an Automatic Call Distribution system, ACD, during a set time interval, the method comprising the steps of:
computing a current average speed of answer, SA, for the number of calls received by the ACD during the set time interval, by dividing total waiting time to answer for the calls by the number of calls;
scaling the current SA by a weight factor W; and updating the real time average speed of answer, RASA, by scaling a previous RASA by a weight factor (1−W), and augmenting it by the scaled current SA to provide an updated RASA and applying the updated RASA to control handling of calls received by the ACD.

25. The computer-readable medium having computerexecutable instructions for performing the method of automatically updating a real time average speed of answer as in claim 24 further comprising measuring a time to answer for each call from the time of detection of the call by the ACD and assigning the call to a selected agent, and using the time to answer to compute the SA.

26. The computer-readable medium having computer-executable instructions for performing the method of automatically updating a real time average speed of answer as in claim 24 further comprising:
detecting an incoming call to the ACD;
determining the incoming call via a dialed telephone number; and
assigning the incoming call to a selected queue based on characteristics of the dialed telephone number.

27. The computer-readable medium having computerexecutable instructions for performing the method of automatically updating a real time average speed of answer as in claim 24 further comprising:
detecting an incoming call to the ACD;
determining the incoming call via a telephone trunk line; and
assigning the incoming call to a selected queue based on characteristics of the telephone trunk line.

28. The computer-readable medium having computerexecutable instructions for performing the method of automatically updating a real time average speed of answer as in claim 27 further comprising determining a maximum time delay in the queue for the call that is a predetermined fraction of a previous time interval RASA or a combination of previous time intervals RASA's for the selected queue.

29. The computer-readable medium having computerexecutable instructions for performing the method of automatically updating a real time average speed of answer as in claim 27 further comprising shortening the maximum time delay in the queue for the call if an agent is made available before the delay has expired or lengthening if no agent is available after the delay has expired.

30. The computer-readable medium having computerexecutable instructions for performing the method of automatically updating a real time average speed of answer as in claim 29 further comprising adjusting the maximum time delay in the queue for a subsequent call in the same queue to reflect a speed of answer value of a previous assigned call or a combination of speed of answer values of previous assigned calls.

31. A system for performing the method of automatically updating a real time average speed of answer, RASA, for a number of calls received by an ACD, the system comprising:
at least one processor programmed to compute a current average speed of answer, SA, for the number of calls received by the ACD during the set time interval, by dividing total waiting time to answer for the calls by the number of calls; scale the current SA by a weight factor W; and update the real time average speed of answer (RASA) by scaling a previous RASA by a weight factor (1−W), and augmenting it by the scaled current SA to provide an updated RASA; and
memory in which the updated RASA are stored for use in handling of the calls received by the ACD.

32. The system for performing the method of automatically updating a real time average speed of answer as in claim 31 further comprising:
at least one processor programmed to detect an incoming call to the ACD, determine the identity of the incoming call via a dialed telephone number, and assign the incoming call to a selected queue based on characteristics of dialed telephone number; and
memory in which the SA and RASA are stored.

33. The system for performing the method of automatically updating a real time average speed of answer as in claim 31 further comprising:
at least one processor programmed to detect an incoming call to the ACD, determine the identity of the incoming call to a telephone trunk line, and assign the incoming call to a selected queue based on characteristics of telephone trunk line; and
memory in which the SA and RASA are stored.

34. The system for performing the method of automatically updating a real time average speed of answer as in claim 33 further comprising:
at least one processor to determine a maximum time delay in the queue for the call that is a predetermined fraction of a previous time interval RASA or a combination of previous time intervals RASA's for the selected queue; and
memory in which the SA and RASA are stored.

35. The system for performing the method of automatically updating a real time average speed of answer as in claim 33 further comprising:
at least one processor for shortening the maximum time delay in the queue for the call if an agent is made available before the delay has expired or lengthening if no agent is available after the delay has expired; and
memory in which the SA and RASA are stored.

36. The system for performing the method of automatically updating a real time average speed of answer as in claim 35 further comprising:
at least one processor to adjust the maximum time delay in the queue for a subsequent call in the same queue to reflect a speed of answer value of a previous assigned call or a combination of speed of answer values of previous assigned calls; and
memory in which the SA and RASA are stored.

* * * * *